United States Patent [19]
Gimzewski et al.

[11] Patent Number: 5,780,727
[45] Date of Patent: Jul. 14, 1998

[54] ELECTROMECHANICAL TRANSDUCER

[75] Inventors: James K. Gimzewski, Rueschlikon; Räto R. Schlittler, Schoenenberg, both of Switzerland; Mark E. Welland, Cambridge, Great Britain

[73] Assignee: International Business Machines Corporation, Armonk, N.Y.

[21] Appl. No.: 793,788

[22] PCT Filed: Sep. 12, 1994

[86] PCT No.: PCT/EP95/03052

§ 371 Date: Mar. 5, 1997

§ 102(e) Date: Mar. 5, 1997

[87] PCT Pub. No.: WO96/08701

PCT Pub. Date: Mar. 21, 1996

[51] Int. Cl.⁶ .............................. G01H 11/06; G01L 9/00
[52] U.S. Cl. ............... 73/105; 73/514.21; 73/514.34; 73/514.36; 257/415; 257/417
[58] Field of Search .................. 73/105, 514.21, 73/514.22, 514.23, 514.34, 514.36, 514.37, 514.38; 250/306; 257/414–418

[56] References Cited

U.S. PATENT DOCUMENTS

| | | | |
|---|---|---|---|
| 3,351,786 | 11/1967 | Muller et al. | 257/289 X |
| 3,585,415 | 6/1971 | Muller et al. | 257/418 X |
| 4,378,510 | 3/1983 | Bennett | 73/514.34 X |
| 4,480,488 | 11/1984 | Read et al. | 257/418 X |
| 5,279,162 | 1/1994 | Takebe et al. | 73/514.34 X |

FOREIGN PATENT DOCUMENTS

| 6-194381 | 7/1994 | Japan | 73/514.34 |
|---|---|---|---|

OTHER PUBLICATIONS

Schellin et al., "A Monolithically–Integrated Transistor Microphone: Modelling and Theoretical Behavior", Sensors and Actuators A, vol. a37–a38, Jun.–Aug. 1993, pp. 66–673.

*Primary Examiner*—Hezron E. Williams
*Assistant Examiner*—Daniel S. Larkin
*Attorney, Agent, or Firm*—James E. Murray

[57] ABSTRACT

A field effect transistor and a piezoelectric sensor are positioned between layers of silicon and aluminum to function as a bimetallic electromechanical transducer. The transducer can be used in atomic force microscopy or as an actuator, a chemical sensor, or an oscillator.

16 Claims, 1 Drawing Sheet

ELECTROMECHANICAL TRANSDUCER

The present invention relates to an electromechanical transducer comprising a flexible element and an amplifier, wherein the transducer generates an electrical output in sympathy with the movement of the flexible element. The present invention also relates such a transducer employed as a cantilever in local probe microscopes, as sensors, or as oscillators.

BACKGROUND OF THE INVENTION

Electromechanical transducers are found In a broad range of technical fields. They are applied as parts of oscillating circuits, vibrators, sensors, microactuators, or local probe devices, such as the atomic force microscope (AFM). The following presents a variety of known devices taken from different technical fields. These devices emphasize the broad applicability of electromechanical transducers.

An integrated force sensor is described by R. H. Taylor and D. J. Webb in IBM's Technical Disclosure Bulletin, Vol. 25, No. 12, May 1983 on pages 6424/5. This sensor consists of a piezoelectric layer coupled to an elongated gate of an associated field-effect transistor. Pressure on the piezoelectric layer charges the gate electrode and thus modulates the channel conductance of the field-effect transistor.

Another known device is presented by H. C. Nathanson et al. in the IEEE Transactions on Electron Devices, Vol. ED-14, No. 3, March 1967, pp. 117–133, as "resonant gate transistor (RGT)". The RGT employs a beam-shaped electrode suspended over the drain and source of a MOS-type field effect transistor. The oscillations of the (charged) beam vary the channel of the transistor. With an appropriate feedback circuit, the RGT can be forced to oscillate with a constant frequency.

The use of an electromechanical transducer as a "dual direction switch" is demonstrated in U.S. Pat. No. 5,034,648. In this document a piezoelectric rod is attached to the gates of two field-effect transistors.

A piezoelectric actuator for micromechanical devices is further described in Sensors and Actuators, A21–A23 (1990), pp. 226–228 by F. R. Blom et al. The actuator is formed by a multilayered cantilever which consists of a $SiO_2$ layer and a ZnO layer, both sandwiched between two metal layers. Any voltage applied to the metal layers gives rise to a deflection of the cantilever. Unimorphous or bimorphous piezoelectric cantilevers have also found entry in the field of atomic force microscopy (AFM). Atomic force microscopy is a specific variant of the so-called "local probe methods", all of which involve the use of a tip with an apex having a curvature in the range of 10 to 100 nm. The tip or probe is brought into proximity of a sample to be investigated by means of piezoelectric transducers. In AFM and related techniques, the tip is attached to a piezoelectric cantilever. Numerous proposals are known to exploit the piezoelectric material of the cantilever in order to control its deflection when approaching the surface to the sample. Examples of these proposals are found in the European patent application EP-A-0 492 915, showing several ways of producing cantilever probes with several piezoelectric layers and an appropriate number of electrodes to apply a voltage to the piezoelectric layers. U.S. Pat. No. 4,906,840 discloses a similarly layered cantilever structure with a piezoelectric bimorphous layer allowing the cantilever beam to be bent in opposite directions from its rest position. In some embodiments, the control circuitry necessary to load the piezoelectric bimorph is proposed to be integrated into the substrate from which the cantilever is etched.

Another attempt to produce small Integrated cantilevers for atomic force microscopy Is known from: M. Tortonese et al., Appl. Phys. Lett. 62 (8), 22. Feb. 1993, pp. 834–836. The described bending detection scheme uses a piezoresistive strain sensor. The deflection of the cantilever can be measured directly from the resistivity of a piezoresistive layer within the cantilever beam. This resistivity is determined by an external Wheatstone bridge. The base material silicon itself serves as the piezoresistive layer. In the European patent application EP-A-0 290 647, the deflection of the cantilever is measured by attaching a piezoelectric oscillator to the cantilever and determining the shift of frequency occurring when the cantilever is subject to a force gradient. Using this principle, K. Takata presents in the Rev. Sci. Instrum. 64 (9), Sept. 93, pp. 2598–2600 a device with a piezoelectric vibrator Incorporated into the cantilever. By forming the vibrator as a bimorphous cantilever for an AFM, the tip-to-sample spacing and the force gradient can be detected simultaneously. As is apparent from the prior art, in several fields attempts have been made to fabricate cantilevers for local probe techniques, as well as other sensors and oscillators in an integrated manner. However, all known proposals still heavily depend on external circuitry which make up for a large fraction of the size and complexity of the described devices. These devices require accurate alignment and additional wiring. Therefore, It is the object of the present Invention to provide a electromechanical transducer with a high degree of integration. It is a more specific object of the present invention to provide a robust transducer which can readily be Introduced Into larger devices. A further object of the invention concerns highly Integrated cantilever structures for local probe microscopy, sensors, actuators, and oscillators allowing for better control, especially of bending and deflection.

SUMMARY OF THE INVENTION

In accordance with the present invention the transducer of this invention comprises a flexible element incorporating an essential part of an amplifying circuit. With the exception of an external power supply, the amplifying circuit is completely incorporated into the flexible element. In a preferred embodiment, this amplifying circuit is a field-effect transistor wherein a small gate voltage is used to control the current flowing from source to drain. The preferred dimensions of the flexible element range in case of highly sensitive devices from 1 mm to down to 1 micron in either direction. The amplifying circuit is advantageously fabricated using to thin film transistor (TFT) technology. Thin film transistors are basically analogous to metal-oxide semiconductor field-effect transistors (MOSFETs) but whereas high quality single crystal substrates (wafers) are used for MOSFETs, all components in TFTs can be deposited onto an insulating substrate, for example $SiN_x$, $SiO_x$, $SiO_xN_y$, $TaO_x$, $Al_2O_3$, or composite layers. Advantageously, the base material of the flexible element or oxides of this material are used as a substrate for the TFT device. In case the amplifying device to be incorporated into the flexible element is a FET, at least a source, a drain, and a gate electrode has to be deposited onto the substrate. Suitable electrodes are made of conducting material, in particular metals, such as Au, Al, Mo, Ta, Ti, ITO (indium-tin oxide), NiCr, or Cu being deposited by evaporation and photoetching, or other techniques. To insulate the gate electrode from the semiconducting channel which connects drain and source, the same dielectric materials as mentioned above as base materials for substrates are applicable. These layers can be deposited by evaporation, sputtering, chemical vapor deposition (CVD), molecular beam epitaxy (MBE), or the like. Provided a suitable metal is used as the gate electrode, the Insulating layer may also be produced by causing anodic oxidation to this electrode. The semiconducting channel itself can be based on materials including Si, a-Si:H, poly-Si, CdSe, Te, In, Sb, or Ge. For specific areas, such as the ohmic contact to the source or drain electrode, n+ doped a-Si:H or doping with barrier metals might be considered. These materials are deposited by evaporation, sputtering, CVD, MBE, or by other known techniques. The layer is patterned by either photolithography with etching, plasma etching, or ion beam milling. It is also feasible to use a lithographic process which involves a scanning probe microscope.

As a further aspect of the invention, the flexible element also incorporates voltage generating means, preferably piezoelectric elements. These elements form either a single layer (unimorph) or a combination of two (bimorph) or several layers (multimorph). Thus, the voltage generating means can be tailored so as to produce a voltage when being elongated, compressed, stressed, or strained. Preferred piezoelectric materials include ZnO, AlN, and PZT, which can be sputtered onto the base material. Other piezoelectric materials, In particular polymers, such as polyvenylidene fluoride (PVDF) or copolymers thereof, can be applied if bonded to the substrate by an adhesive material or a suitable glue.

The flexible element of this Invention is characterized by having elastic properties (spring constant) and by being able to perform a bending or oscillatory movement. Examples of the flexible elements are cantilever structures as found in the atomic force microscopy, or thin membranes used for various applications. For reasons of compatibility with the existing integrated circuit technology, preferred base materials include silicon or silicon nitride and their respective oxides. Flexible elements are produced by anisotropic etching with alkaline solutions, such as KOH (potassium hydroxide), solutions of EDP (ethylenediamin, pyrocatechol, and water), solutions of hydracine, or solutions based on ammoniumhydroxide or tetramethyl ammoniumhydroxide and water.

Using an integrated device comprising a flexible element, voltage generating means and an electronic amplifier, output signals between 1μV and 5V are generated for displacements of the flexible element well below one nanometer. In operation, the voltage generating means produces a voltage depending on the amount of deflection or bending of the flexible element. This voltage modulates either the electrical field and in sympathy the source-drain current, or drives the base current in case of a base collector amplifier.

Referring to a further aspect of the invention, advantageously the amplifying means are protected against any peak voltage potentially produced by the piezoelectric elements. Suitable protection can be provided by a bias voltage applied to the gate electrode or in, two terminal devices (diodes) having a fixed breakthrough voltage integrated into the flexible element (integrated protection diode), voltage divider, etc..

As another aspect of the Invention, the flexible element acts as a transducer which translates other physical properties, such as force, heat, and light intensity into a displacement. In a preferred embodiment of this aspect of the invention, a tip Is attached to the flexible element to give an improved sensor for local probe devices, as are defined above. Compared to known AFM techniques, such as the above-mentioned piezoresistive cantilever, this embodiment provides a higher degree of integration with the first amplifier stage being part of the cantilever structure. The energy dissipation and noise limitations are reduced. Further, when comparing the new cantilever with other known AFM techniques, complex, macroscopic read-out devices or detectors, in many cases optical devices, for measuring the deflection of the cantilever are avoided. In another preferred embodiment of this aspect of the invention, the flexible element includes at least two layers with different thermal expansion coefficients. Thus, a temperature change causes a deflection of the flexible element in a fashion known as "bimetal" effect. When the thermal expansion coefficients of the two layers differs by at least a factor of ten, even small temperature changes can be monitored. The applicability of this "bimetal" variant of the invention can be enlarged by including chemically active layer, for example a catalyst or an absorbing layer, as described in the international application PCT/EP93/01742. Any heat dissipation due to a chemical reaction at the chemical active layer is transduced via the displacement of the flexible element into a detectable electrical signal. The sensitivity range of this cantilever structure spans into the nano- and even into the picowatt region.

The "bimetal" variant of the Invention Is further improved by providing means for a heat calibration. This heat calibration Is achieved by a resistive heating element, preferably a loop of a conducting material deposited onto the flexible element. With the resistance of the loop known, a defined amount of heat can be applied-to the flexible element. The device is calibrated by measuring the deflection caused by different amounts of heat.

The resistive heating element can also be used to perform thermal ab-/desorption studies of molecules.

As the present invention can be based on standard silicon and TFT technology, a mass production of devices according to this invention is readily feasible. By combining silicon micromachining, described for example by K. E. Petersen in the IEEE Transaction on Electron Devices, Vol. ED-25, No. 10, pp. 1241–1249, with the technology applied to produce TFT displays, large arrays of devices according to the current invention can be manufactured to provide touch or heat sensitive screens and panels. The robustness of silicon guarantees a long lifetime and a sufficient protection against physical destruction. Another standard material which may be applied to manufacture a device according to this invention may be gallium arsenide and its alloys, e.g. AlGaAs. Processing techniques for this material are described for example In J. Micromech. Microeng. 4 (1994), p. 1–13 by K. Hjort et al.

These and other novel features believed to be characteristic of the invention are set forth in the appended claims. The invention Itself however, as well a preferred mode of use, and further objects and advantageous thereof, will best be understood by reference to the following detailed description of illustrative embodiments when read in conjunction with the accompanying drawings.

DESCRIPTION OF THE DRAWINGS

The invention is described in detail below with reference to the following drawings.

MODE(S) FOR CARRYING OUT THE INVENTION

Figure 1A:
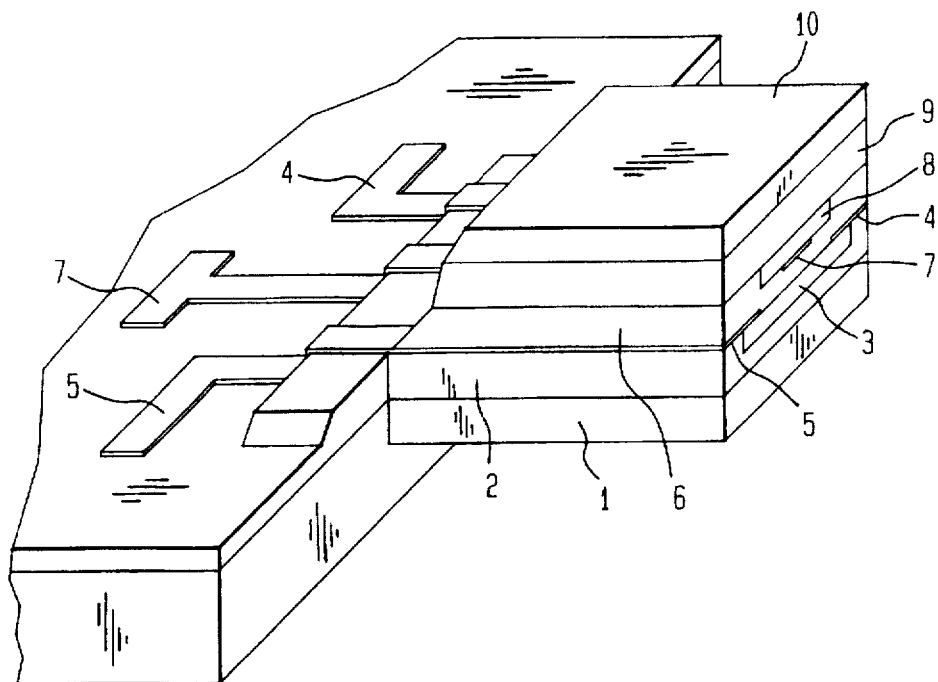
FIGS. 1a and 1b show a silicon based micromechanical cantilever in accordance with this invention.
Figure 1B:
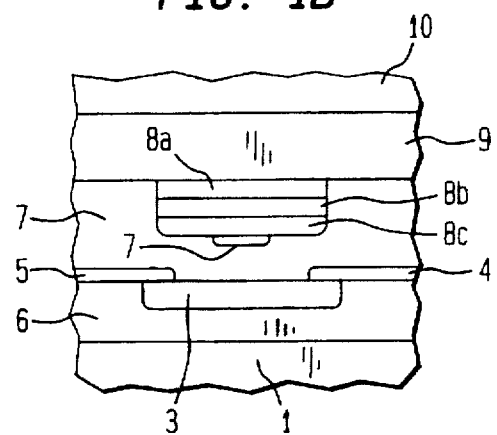

Referring now to FIG. 1, an insulating layer 2 of $SiO_2$ is grown on a base material comprising Si. Next, a semiconducting channel is provided by the deposition of a layer 3 of amorphous Si (a-Si). An aluminum layer is sputtered onto the a-Si layer and patterned by photolithography leaving two separated conductive pads forming a source 4 and a drain electrode 5, respectively. In a chemical vapor deposition (CVD) step, another insulating oxide film 6 is grown onto the structure to separate the drain and source electrode from a gate electrode 7 produced in the same manner as the other two electrodes. The gate electrode Itself is covered by a layer 8 of rf-sputtered zirconium titanate. As shown in FIG. 1b, the piezoelectric element can be formed in multiple layers 8a to 8c as described herein above. This material shows a strong piezoelectric effect. A thick layer 9 of aluminum is deposited next which together with the base material is used to produce a "bimetal" effect, as will be described below. The staggered layers are covered at the top by a chemically active layer 10 of platinum, which in this example serves as catalyst.

The cantilever is given its final shape by anisotropic etching with EDP as described above. The three electrodes 4,5,7 are shown with pads for external electrical contacting.

The overall dimensions of the cantilever are 150×50×4µm$^3$, the bulk of which is taken by the base layer 1 and the Al layer 9. The other layers have a typical thickness of below 500 µm. It should be noted that the device of FIG. 1 is not drawn to scale.

In operation, the amplification factor of the TFT-FET is chosen to be 100. The device is tested by using the reaction:

$$H_2 + \tfrac{1}{2}O_2 \rightarrow H_2O$$

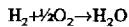

with a reaction enthalpy of 242 kJ/mol, catalyzed by the Pt layer 10. The device is placed into a suitable vacuum chamber, which is filled with a mixture of $H_2$ and $O_2$ in the correct stoichiometric ratio (2:1) up to a pressure of 2×10$^{-2}$ mbar.

Due to the heat production $\Delta Q/\Delta t$ of the reaction at the catalytic surface 10, the temperature of the cantilever rises until the produced heat is balanced by the heat losses $\Delta Q(Loss)/\Delta t$. The temperature produces a different elongation of the AL layer 9 and the Si base layer 1. Due to the bimetallic effect, the cantilever bends and the stress induced in the piezoelectric layer 8 gives rise to a voltage. It can be shown that a temperature change of about 1 K generates a voltage of about 2 V depending on the size of the piezoelectric layer. With the given amplification factor, the sensitivity of the device is estimated as being around 100 V/K. With a noise level of about 1 mV, measurement is limited to temperature changes above 10$^{-5}$ K. This clearly demonstrates the potential of the current invention ways of optimization are known to those skilled in the art. The structure of the cantilever may be refined to give an increased length or an enlarged sensitive area. Another possible improvement includes segmenting the elements of the cantilever structure, e.g. having a FET or a piezoelectric layer only within limited parts of the cantilever, or incorporating several FET into one flexible element.

Figure 2:
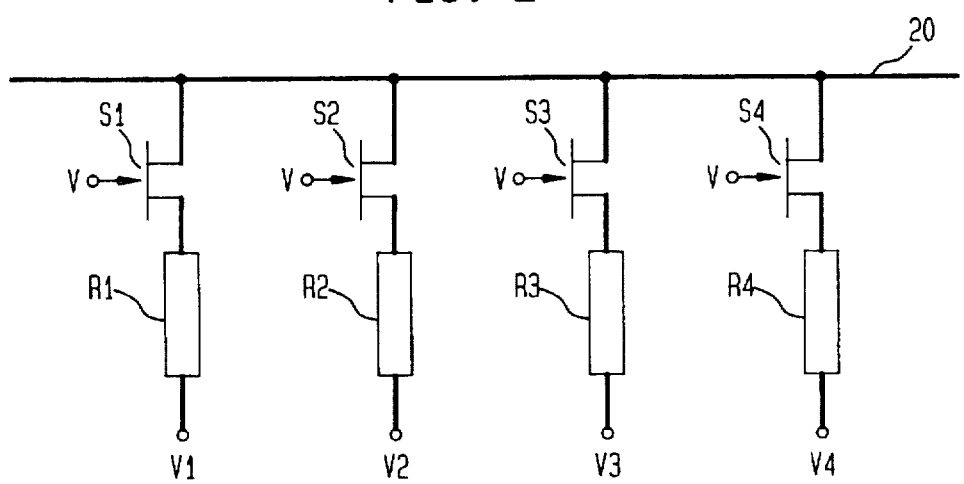
FIG. 2 depicts schematically an array of devices in accordance with the current invention.

Referring now to FIG. 2, an array of devices in accordance with the invention is shown, which essentially eliminates inevitable problems associated with stray capacitance, cross talk, and noise inherent in known approaches which involve connecting separate transducers to amplifiers and signal processors via wiring. The new array is simplified to facilitate the use of mass production techniques as known from the field of TFT display manufacturing.

The devices in accordance with this invention, e.g., cantilevers, sensors, actuators, or oscillators, are represented by the symbol of a field-effect transistor FET S1, . . . , S4 The source electrodes of the FETs are connected to the external voltage supply 20. The drain of each of the device is coupled to a load resistor R1, . . . , R4 to generate a voltage signal at the outputs V1, . . . , V4 for further processing. As pointed out previously, suitable bias protection can be provided by a bias voltage V applied to the gate electrodes of the FETs.

We claim:

1. Electromechanical transducer comprising:
   at least one flexible element;
   voltage generating means for responding to deflections of said flexible element; and
   an amplifying circuit which with the voltage generating means is incorporated in said electromechanical transducer with said flexible element as a unitary structure, said amplifying circuit means having at least one field-effect transistor with a gate electrode operable by said voltage generating means for measuring deflections of said flexible element and having protection means against breakthrough voltage.

2. Electromechanical transducer in accordance with claim 1, wherein the voltage generating means comprises piezoelectric material.

3. Electromechanical transducer in accordance with claim 2, wherein the piezoelectric material has a multimorphous structure.

4. Electromechanical transducer in accordance with claim 1, wherein the flexible element further comprises at least two metallic layers, having different thermal expansion coefficients, with the voltage generating means and the amplifying circuit sandwiched therebetween.

5. Electromechanical transducer in accordance with claim 4, wherein the flexible element is covered by a chemically active or absorbing layer.

6. An electrical transducer comprising:
   a first silicon flexible member;
   a field effect transistor having gate, source, and drain electrodes formed in layers on said flexible member;
   a piezoelectric material formed on the gate of the field effect transistor to sense flexing of the first flexible member;
   a second aluminum flexible member with a different coefficient of expansion than the first flexible member, said second flexible member covering the piezoelectric material so that field effect transistor and the piezoelectric material are sandwiched between the first and second flexible elements to form an integral unit of the mentioned elements; and
   leads extending from the cate, source, and drain electrodes for supplying electrical energy to the field effect transistor and sensing electrical responses of the field effect transistor to the flexing of the metallic elements.

7. The electrical transducer of claim 6 wherein said piezoelectric material has a multimorphous structure.

8. Electromechanical transducer comprising:
   at least one flexible element covered by a chemically active or absorbing layer;
   voltage generating means for responding to deflections of said flexible element;
   an amplifying circuit which with the voltage generating means is incorporated in said electromechanical transducer with said flexible element as a unitary structure, said amplifying circuit means having at least one field-effect transistor with a gate electrode operable by said voltage generating means for measuring deflections of said flexible element; and at least two metallic layers in said flexible element, said two metallic layers having different thermal expansion coefficients and having the voltage generating means and the amplifying circuit sandwiched therebetween.

9. Electromechanical transducer in accordance with claim 8, wherein the voltage generating means comprises piezoelectric material.

10. Electromechanical transducer in accordance with claim 9, wherein the piezoelectric material has a multimorphous structure.

11. Electromechanical transducer in accordance with claim 8, wherein the transistor further comprises protection means against break-through voltage.

12. An electrical transducer comprising:

a body of the electrical transducer;

a first flexible member extending out from the body of the electrical transducer;

a field effect transistor having gate source, and drain electrodes and an insulating layer between the gate, source, and drain electrodes formed in layers on said flexible member:

a piezoelectric material formed on the gate of the field effect transistor to sense flexing of the first flexible member, and a second flexible member covering the piezoelectric material so that field effect transistor including the gate, drain, and source electrodes and the piezo electric material are sandwiched between the first and second flexible elements to form an integral cantilever unit of the mentioned elements that extends out from said body.

13. The electrical transducer of claim 12 wherein the first and second flexible members are metallic with different coefficients of thermal expansion to provide a bimetal effect to bend the cantilever unit in response to temperature changes to produce a voltage from the transducer.

14. The electrical transducer of claim 12 wherein one of said flexible members is silicon and the other is aluminum.

15. The electrical transducer of claim 13 including a chemically active or absorbing layer which generates heat over the second flexible member.

16. The electrical transducer of claim 12 wherein said electrical transducer is a microscope probe.

\* \* \* \* \*